May 28, 1963  H. M. THOMAS  3,091,193
HINGED STAKE FOR FLAT-CAR LOADING
Filed April 17, 1961  2 Sheets-Sheet 1
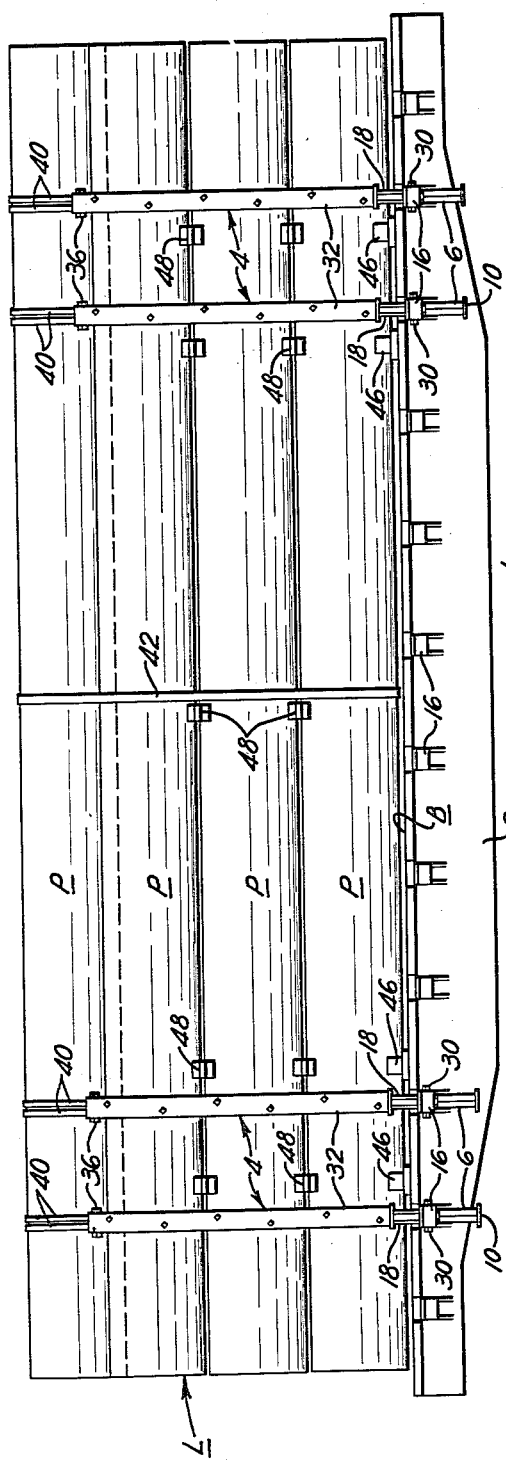
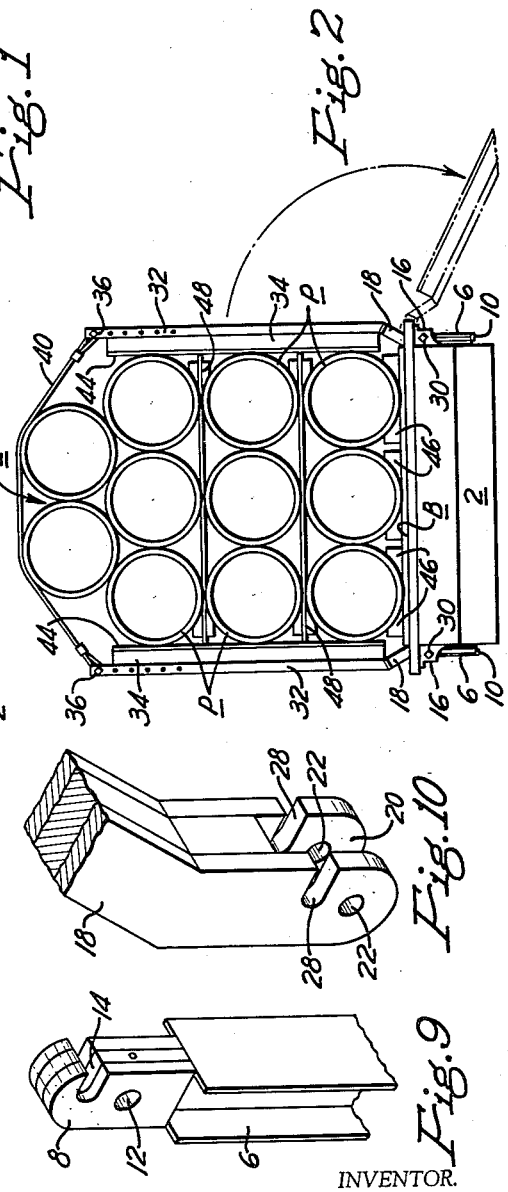
INVENTOR.
HOLLIS M. THOMAS,
Deceased
GARLAND S. THOMAS,
Administratrix
By Donald G. Dalton
ATTORNEY May 28, 1963    H. M. THOMAS    3,091,193
HINGED STAKE FOR FLAT-CAR LOADING
Filed April 17, 1961    2 Sheets-Sheet 2

INVENTOR.
HOLLIS M. THOMAS,
Deceased
GARLAND S. THOMAS,
Administratrix
By Donald G. Dalton
ATTORNEY United States Patent Office 3,091,193
Patented May 28, 1963

3,091,193
HINGED STAKE FOR FLAT-CAR LOADING
Hollis M. Thomas, deceased, late of Pleasant Grove, Utah, by Garland S. Thomas, administratrix, Pleasant Grove, Utah, assignor to United States Steel Corporation, a corporation of New Jersey
Filed Apr. 17, 1961, Ser. No. 103,960
3 Claims. (Cl. 105—386)

The present invention relates generally to load transporting equipment and more particularly to an improved stake for use in retaining a load on the load bed of a transport vehicle.

The stake of my invention is especially suited for use in the securement of loads of elongated articles on flat bed transport vehicles. Therefore, the invention is hereinafter described in connection with the shipment of lengths of relatively large diameter steel pipe on railroad flat cars, but it is to be understood that the invention is not limited to such application.

Prior to my invention it was common practice to ship large diameter pipe in gondola type railroad cars. The method of loading the pipe in the gondola cars consisted of first placing wooden dunnage on the bottom of the car and then hoisting the lengths of pipe into the car and depositing them in tier fashion on the dunnage. After the pipe lengths had been thus loaded in the car, the load was tied together with flat band steel strapping which was wrapped around the load at intervals along its length. Wooden timbers of various size were then inserted between the load and the sides of the car to block the load.

The considerable amount of wooden dunnage and blocking timber required to secure the load of pipe in the gondola car not only increased the shipping costs and man-hours necessary to prepare and load the car but also reduced the capacity of the car due to the higher bed formed by the wooden dunnage. A further disadvantage inherent in shipping pipe in gondola cars was the fact that more often than not the gondola cars were not returned to the shipper's plant so that the wooden dunnage and blocking timber was lost completely.

Another disadvantage of shipping pipe by gondola car affected unloading operations. The pipe could only be unloaded from the car by an overhead crane or boom hoist. Fork lift tractors or similar equipment obviously could not be used.

It is, accordingly, the primary object of my invention to provide an improved load-retaining stake of novel construction which can be used in conjunction with railroad flat cars or similar transport vehicles to render such vehicles capable of carrying loads of elongated articles with a minimum of wooden dunnage, blocking timber, and strapping.

It is another object of my invention to provide an improved load-retaining stake of hinged construction whereby the stake can be easily manipulated to expose the load for side-unloading.

It is a further object of my invention to provide a load-retaining stake of the character described which can be removed from engagement with a load without being removed from its attachment with the transport vehicle bearing the load.

These and other objects will become more apparent after referring to the following specification and attached drawings in which:

FIGURE 1 is an elevational view of a loaded railroad flat-car equipped with hinged stakes according to the invention;

FIGURE 2 is an end view of FIGURE 1 including a partial showing in broken lines of a stake of the invention in position for unloading;

FIGURE 9 is a perspective view of the upper portion of the foot member of the stake of the invention; and FIGURE 10 is a perspective view of the lower portion of the bracket of the stake of the invention.

Figure 3:
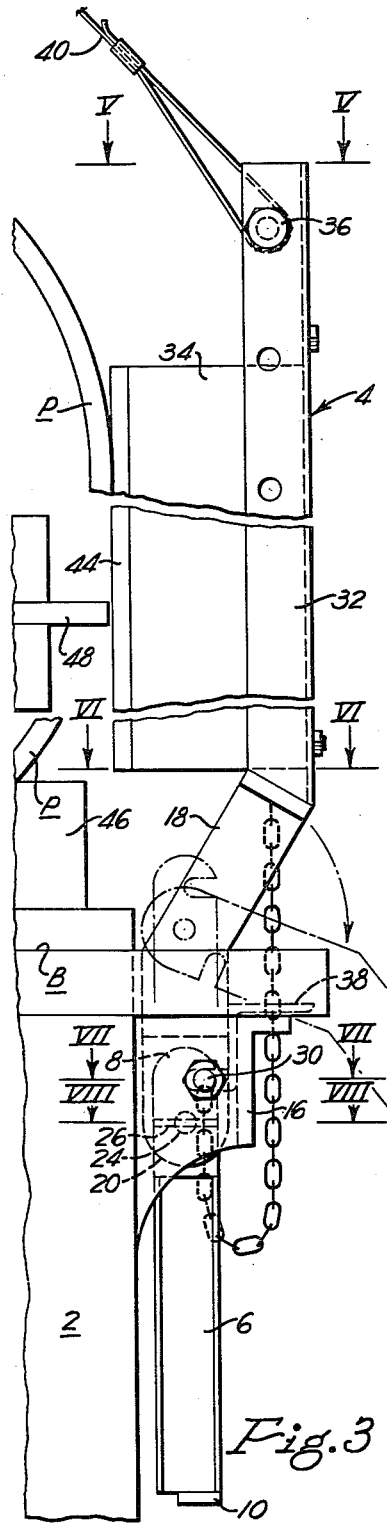
FIGURE 3 is a partial enlarged detail view of the right side of FIGURE 2.
Figure 4:
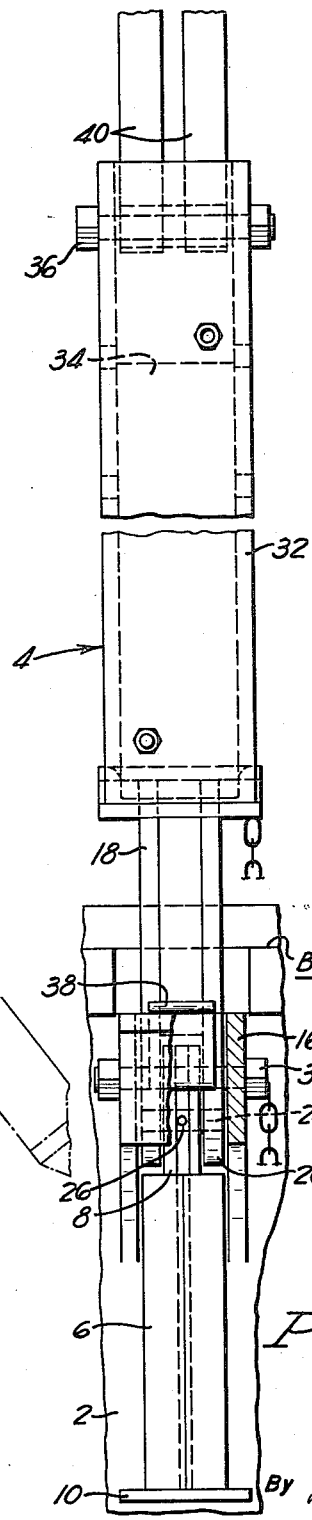
FIGURE 4 is a view looking at the right side of FIGURE 3.
Figure 5:
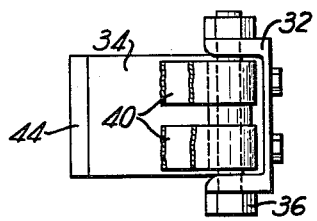
FIGURE 5 is a top plan view taken along the line V—V of FIGURE 3.
Figure 6:
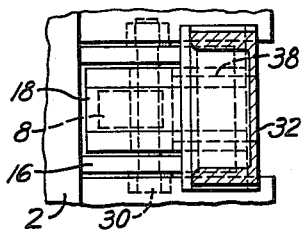
FIGURE 6 is a sectional view taken along the line VI—VI of FIGURE 3.
Figure 7:
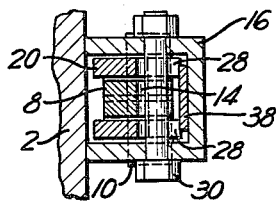
FIGURE 7 is a sectional view taken along the line VII—VII of FIGURE 3.
Figure 8:
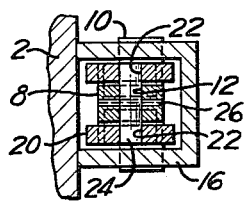
FIGURE 8 is a sectional view taken along the line VIII—VIII of FIGURE 3.

Referring more particularly to the drawings reference numeral 2 designates generally a railroad flat car having a load L of pipe lengths P thereon secured with load-retaining stakes 4 in accordance with the invention.

The stakes 4 are identical, therefore, only one will be described in detail.

Stake 4 includes an elongated foot member 6, preferably made of steel channel sections and plates, having an upper part 8 of reduced cross-sectional area and a stop-plate 10 disposed across its bottom and extending beyond the sides thereof. The upper part 8 is provided with a transverse hole 12 therethrough and a notch 14 above the hole 12 extending inwardly from one edge thereof. The top of the part 8 is curved, as best shown in FIGURE 9.

The foot member 6 is dimensioned to fit slidably in one of the stake pockets 16 on the side of the car 2. The stake pocket is open at the top and bottom and the foot is inserted into the pocket from the bottom thereof. The stop plate 10 prevents complete removal of the foot from the pocket in manipulating the stake as will become clear hereinafter.

A bracket 18, which may be made of steel plates, is connected with the upper part of the foot member 6 and projects upwardly from the stake pocket 16. A clevis or fork 20 having rounded bottom edges is formed on the bottom of the bracket 18 which engages the upper part 8 of the foot member 6 within the pocket 16. The sides of the clevis 20 are provided with matching transversely directed holes 22 which align with the hole 12 in the upper part of the foot member for receiving a pintle 24 which pivotally secures the foot member and the bracket together. The pintle 24 is secured against axial movement in the aligned holes by means of a lock pin 26. The sides of the clevis are also provided with inwardly extending matching notches 28 which are aligned with the notches 14 in the foot member 6 when the upper part 8 is engaged within the clevis 20 and the bracket and foot member are in alignment. A locking pin 30 passes through suitable holes in the sides of the stake pocket 16 and through the aligned notches 14 and 28 to secure the stake within the stake socket. In addition to holding the stake in the pocket, the pin 30 also locks the bracket 18 against pivotal movement relative to the foot member 6. The locking pin 30 may be attached to the upper portion of the bracket by means of a chain so that it will not be lost when removed to permit manipulation of the stake.

The upper portion of the bracket 18 is vertically offset from the clevis 20 and is rigidly connected with, as by welding or similar means, with the bottom of a post 32. The post 32 is channel shaped and is normally disposed with its open side facing the vertical plane containing the bed B of the car 2 when in operating position. The post 32 is channel shaped so that it can receive a wood liner or spacer 34 bolted thereto. Removable transverse pins 36 are provided in the upper portion of the flanges of the post 32 for a purpose which will become apparent.

As shown in FIGURE 1, two pairs of opposed stakes 4 may be used adjacent each end of the flat car for retaining the load L of pipe lengths thereon. Each of the stakes is locked against pivotal movement with the posts extending upwardly from the car bed. An angle shim 38 is inserted into each of the pockets 16 containing stakes 4 to tighten the fit of the bracket 18 in the pocket. Steel strapping 40 extends over the load between the upper ends of each pair of opposed posts 32. The ends of the strapping are fastened to the pins 36 on the posts 32. A single strapping band 42 may be wrapped completely around the load intermediate its ends. The wood liners in each of the posts 32, which may be varied in size according to the size of the load, assures a sung fit for the load between the stakes. The outer faces of the wooden liners may be covered with a metal strap 44 to prevent excessive wear due to friction. The pipe lengths in the bottom tier of the load may be supported in wooden chocks 46 and transversely extending metal separator bars 48 may be used between the upper tiers of the load to prevent shifting of the individual pipe lengths.

To unload the pipe lengths from the car, the strapping bands 40 and 42 are cut, the locking bolts 30 are removed, and each stake on one side of the car is lifted slightly and the posts 32 are turned donwardly to expose one side of the load. The car can then be unloaded by a fork truck or overhead hoist means, as desired. The stop plate 10 prevents each stake from being completely removed from the pocket 16 when it is lifted to turn the post 32 downwardly. This prevents unintentional removal of the stakes from the car.

After the car has been unloaded the posts 32 are returned to vertical position and the locking bolts 30 are re-inserted to secure the stakes in the stake pockets of the car and to lock the brackets 18 against pivotal movement.

While one embodiment of my invention has been shown and claimed it will be apparent that other adaptations and modifications may be made without departing from the scope of the following claims.

I claim:

1. In a vehicle having a load-bearing bed and an open-end stake-receiving pocket on one side of said bed, a load-retaining stake comprising an elongated foot member having an upper part of reduced cross-sectional area, said foot member being slidably mounted in said pocket with said upper part normally disposed within the pocket and the remainder thereof projecting downwardly from the pocket, means on said foot member effective to resist removal of said foot upwardly out of said pocket, a bracket having a clevis formed on its lower end mounted with said clevis pivotally engaging said upper part of said foot in said pocket and the remainder thereof normally projecting upwardly of the pocket, said clevis and said upper part having aligned transverse holes therethrough, a pintle fitted in said aligned holes for pivotally connecting said bracket and said foot together, said foot being adapted to be lifted partially upwardly out of said pocket so that said bracket is free of said pocket, said bracket being pivotable about said pintle when free of said pocket between a first position extending transversely across said bed and a second position extending away from said bed at an angle more than 180 degrees from said first position, said clevis and said upper part having matching notches offset from said holes and extending inwardly from one side of said clevis and said upper part, said pocket having matching holes in opposite sides thereof aligned with an directed normal to said matching notches, a locking pin removably fitted through the holes in said pocket and said matching notches for securing said foot member and said bracket within said pocket and locking said foot member and said bracket against pivotal movement relative to each other, and a post extending from said remainder of said bracket upwardly of said vehicle bed when said bracket is in said normal position.

2. The combination of claim 1 in which said post is vertically offset from said bracket.

3. The combination of claim 1 in which said post is channel shape and open toward the vertical plane containing said load-bearing bed.

References Cited in the file of this patent

UNITED STATES PATENTS

| | | |
|---|---|---|
| 1,182,942 | Thompson | May 16, 1916 |
| 1,805,872 | Jordan et al. | May 19, 1931 |
| 2,355,867 | Jarvis | Aug. 15, 1944 |
| 2,754,769 | Yorston et al. | July 17, 1956 |
| 2,891,485 | Billups | June 23, 1959 |